INVENTOR.
Jens Axel W. Madsen
BY Horton, Davis, Brewer & Brugman
Attorneys

Oct. 8, 1963 J. A. W. MADSEN 3,106,274
ROTARY IMPACT MECHANISM
Filed Sept. 13, 1960 5 Sheets-Sheet 2
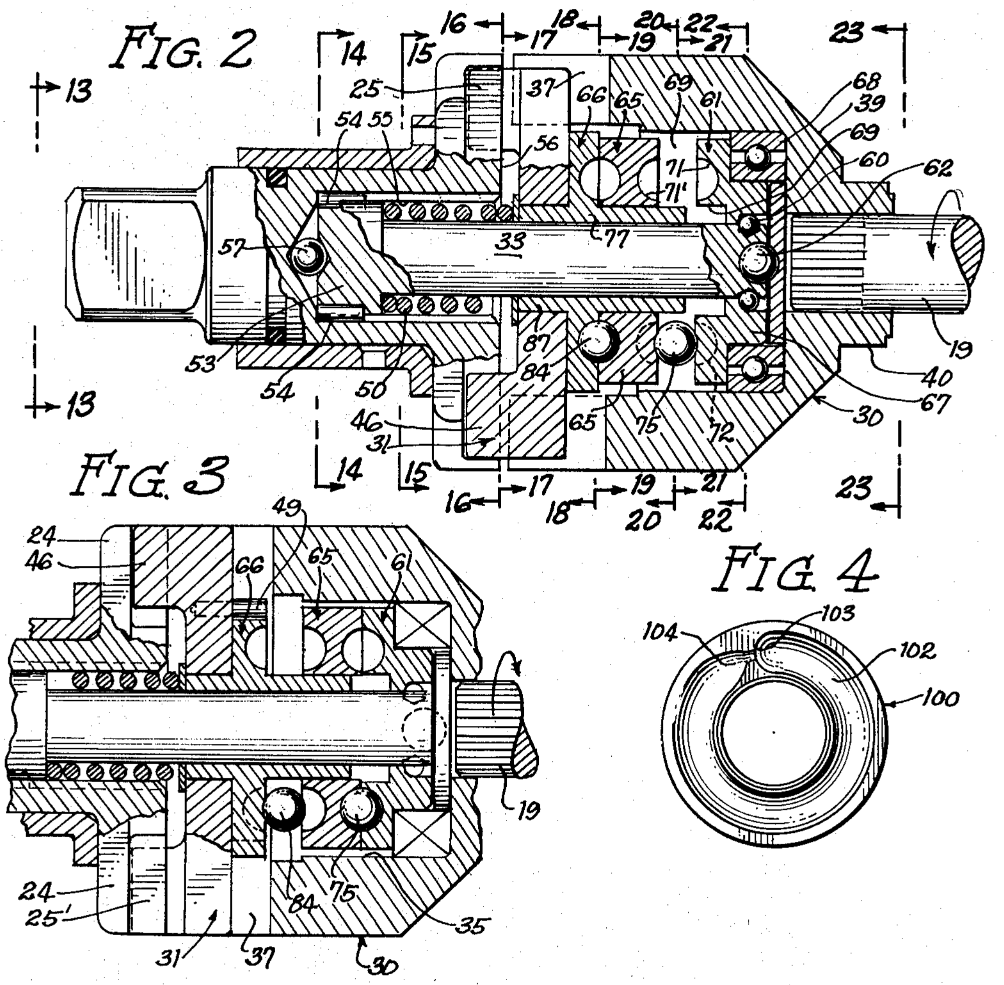
FIG. 2, FIG. 3, FIG. 4
FIG. 5, FIG. 6, FIG. 7
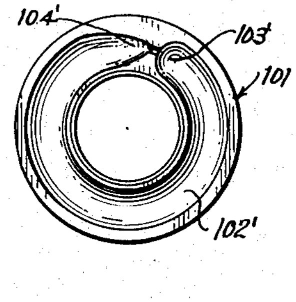
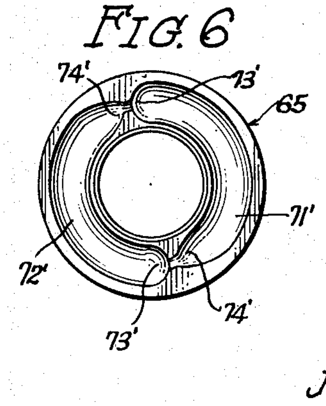
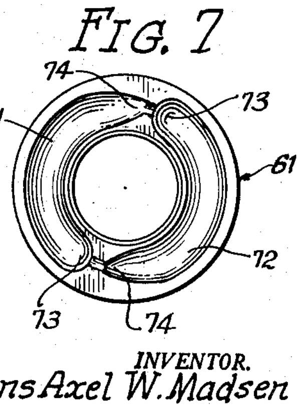
INVENTOR.
Jens Axel W. Madsen
BY
Horton, Davis, Brewer & Brugman
Attorneys INVENTOR.
Jens Axel W. Madsen
BY
Horton, Davis, Brewer & Brugman
Attorneys INVENTOR.
Jens Axel W. Madsen
BY
Horton, Davis, Brewer & Brugman
Attorneys INVENTOR.
Jens Axel W. Madsen
BY
Horton, Davis, Brewer & Brugman
Attorneys

United States Patent Office 3,106,274

Patented Oct. 8, 1963

3,106,274

ROTARY IMPACT MECHANISM

Jens Axel W. Madsen, Sioux City, Iowa, assignor to Albertson & Company, Inc., Sioux City, Iowa, a corporation of Iowa Filed Sept. 13, 1960, Ser. No. 55,664
17 Claims. (Cl. 192—30.5)

This invention relates generally to rotary impact tools and more particularly to improvements in mechanisms therein for intermittently impacting and driving a rotatable member.

In its preferred form, the present invention is embodied in an impact tool of the general description set out in my prior Patent No. 2,886,997, issued May 19, 1959, and entitled Rotary Impact Wrench Mechanism. In keeping with the general purposes and operational characteristics of such a tool, this invention provides improved means for intermittently delivering kinetic energy to driven anvil means on which tool attachments, such as a wrench socket, are normally mounted. To accomplish this a rotatable impact mechanism is directly driven by rotatable motivating means, such as an air motor or the like, capable of rapid acceleration and deceleration. The driving force imparted to the impact mechanism is then periodically delivered to the anvil means by and through an axially shiftable hammer means.

While previous impact mechanisms have generally relied on rotatable hammer mechanisms which are positioned to strike an anvil through centrifugal force or by periodically releasing a resilient energy storing device, my present invention makes novel and material departure from such previous practices.

In short, I have provided an improved driving clutch and cam means operable at preselected intervals of selectively variable frequency to reciprocate a rotatably driven hammer means into and out of positions for impacting an anvil associated with a rotatable spindle thereby to intermittently drive the latter. Further, such clutch and cam means is reverse acting in the sense that reversing rotation of the motivating means and hammer mechanism does not destroy the intermittent driving action of the clutch means.

It may be said therefore that the present invention centers itself primarily about the provision of an improved means for delivering driving force and energy between rotatable driving and driven members or elements; the driving element being subjected to rapid acceleration and deceleration forces. The driving energy is further intermittently released to the driven member by operation of a novel cam-clutch means having selected variable operating characteristics to bring about preselected periods of delivering energy. Thus an improved rotary impact mechanism particularly adapted for impact tool uses and distinguished by improved versatility of operation is afforded by the present invention.

The main object of this invention is to provide an improved rotary impact mechanism adapted for use in driving impact tools.

It is another object of this invention to provide an improved impact mechanism as aforesaid which is characterized by improved ruggedness, dependability, and versatility of operation.

An additional object of this invention is to provide an improved rotary impact mechanism having improved means for periodically delivering driving force to a rotatable member.

Another important object of this invention is to provide a new and improved means in a rotary impact mechanism for intermittently reciprocating a rotating hammer mass into and out of positions of contacting interference with an adjacent anvil means to be driven thereby.

Still another object of this invention is to provide an improved impact mechanism embodying means for varying the frequency with which a rotating hammer means is moved into and out of positions of interfering contact with an anvil to be driven thereby.

Another important object of this invention is to provide a new and improved clutch means between a rotating hammer mass and a relatively stationary anvil whereby kinetic energy stored in the hammer mass may be delivered instantaneously to the anvil at pre-selected frequencies and regardless of the direction of rotation for the hammer mass.

The above and further objects, features, and advantages of this invention will appear from time to time in the description of the preferred embodiment thereof illustrated in the accompanying drawings.

In the drawings:

FIG. 2 is a partial sectional view with portions thereof in elevation, taken substantially along the longitudinal center line of the improved impact mechanism of this invention showing the same divorced from its motivating means and housing, and illustrating the operating relationship of its several elements when delivering driving impact under counterclockwise rotation;

FIG. 3 is another partial cross-sectional view of my impact mechanism with portions in elevation, taken on the same section line as FIG. 2, but showing the elements of the improved impact mechanism related for delivering driving impact under clockwise rotation;

FIGS. 4 and 5 are plan views of opposing cam elements employed in the improved clutch means of this invention, the cam tracks thereof having single lifting nodes;

FIGS. 6 and 7 are plan views, similar to FIGS. 4 and 5, of related modified cam-clutch elements having double cam tracks and lifting nodes;

Figure 1:
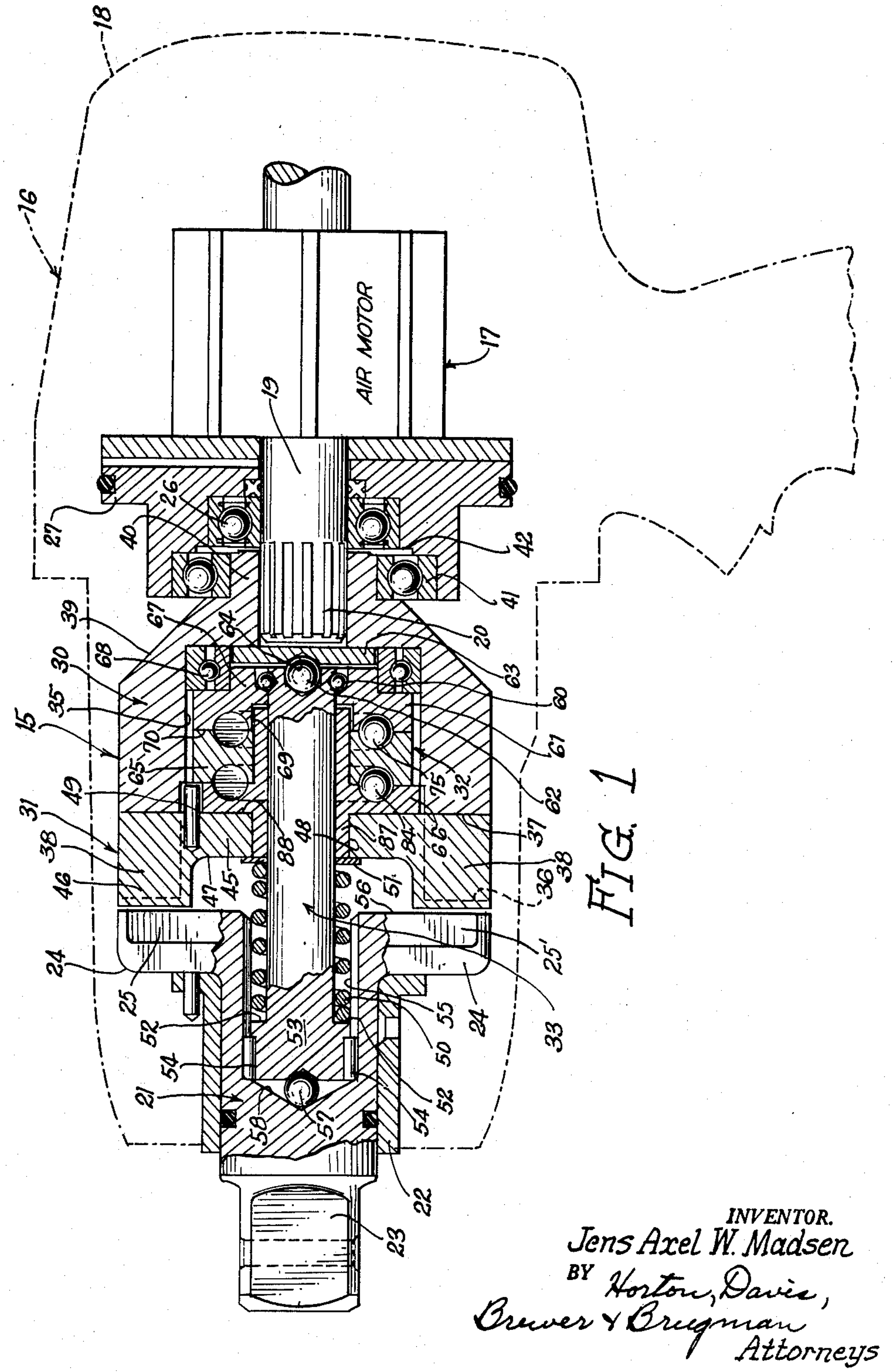
FIGURE 1 is a longitudinal cross sectional view of a preferred form of impact mechanism embodying my invention, with portions thereof in full elevation and showing a typical housing therefor in dotted lines.

In the particular embodiment of my invention herein illustrated, the improved impact mechanism, indicated generally at 15 in FIGURE 1, is shown as an associated portion of an air-driven impact wrench mechanism 16. The wrench 16 embodies an air-operated prime mover or motor 17 enclosed by and mounted in a suitable housing 18 for rotatably driving a single drive shaft 19 which is formed with a splined end portion 20 for driving connection with the impact mechanism 15. Housing 18 also supports and encloses the improved impact mechanism 15 and the latter drives an anvil means 21 rotatably supported in a sleeve bearing 22 mounted in and secured to one end of housing 18. An outer end of the anvil means, projecting beyond its support bearing 22 and the adjacent end of housing 18 is distinguished by a male fitting portion 23 having planar surfaces for engaging and carrying various removable tools or implements such as a wrench socket having an appropriate mating female socket for attachment therewith. The opposite end of the anvil means is formed with a pair of radially outwardly extending and diametrically opposed anvil arms 24, 24, each of which includes a wedge-shaped striking portion having striking surfaces 25 and 25' for driving impact engagement by the impact mechanism 15.

Impact wrench 16 as typified in the drawings, characteristically includes a pistol grip handle portion at one end of its protective outer housing 18 and suitable fittings (not shown) are provided for connection with a flexible hose or other conduit means communicating with a source of compressed air for operating the prime moving air motor 17. Suitable control valves (not shown) are also conventionally provided to regulate, shut off, and reverse the flow of air to the prime mover, all according to recognized practice.

In their assembled relation the anvil means 21 is aligned coaxially with the drive shaft 19 which in turn is driven directly by the prime mover 17, such shaft being supported for rotation in anti-friction bearing means 26 carried by a concentrically surrounding support frame 27 fixed to internal support walls of the housing 18. Connection between shaft 19 and anvil 21 is via the impact mechanism 15 which embodies a rotatable hammer frame 30, a hammer means 31, a cam-clutch means 32, and a spindle member 33. These elemental portions cooperate to periodically transfer kinetic energy from the rotating drive shaft 19 to the anvil means, such function being accomplished largely by causing the rotating hammer means 31 to periodically move axially along the spindle member to strike the anvil means 21 in response to operation of the improved cam-clutch means 32.

The hammer frame 30 constitutes the main support portion for the impact mechanism 15, such functioning somewhat as a flywheel mass and to house the hammer means 31 and improve cam-clutch means 32. To this end (see FIGS. 1 and 8), frame 30 is constructed as a substantially cylindrical cup-like member having a central cup bore 35 opening inwardly of its outer end 36. End 36 is additionally formed with a distinguishing diametrically extending slotted opening or cut-out 37

(see FIGS. 2, 8, and 17) matingly receptive of diametrically opposed arm portions 38, 38 of the hammer means 31. The opposite or inner end of the hammer frame is tapered with an exterior frusto-conical surface 39 and additionally bears an axially projecting cylindrical hub portion 40 (see FIG. 8). Hub portion 40 in turn is axially bored and internally splined for driving connection with the mating splined male end 20 of the drive shaft 19 so that the hammer frame and drive shaft thereby may rotate together. As seen in FIG. 1, the hammer frame is supported externally for rotation in suitable ball bearing means 41 mounted in the annular support frame 27 which also holds the shaft bearing 26; such two bearings being separated by an annular space 42 or the like.

Figure 17:
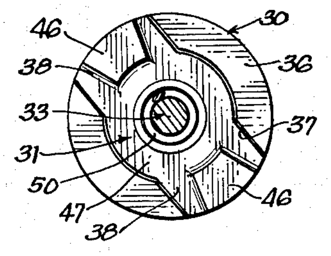

While normally hammer means 31 is nested within one end of the hammer frame 30 so that its cross arms 38, 38 are journalled in the latter's slotted opening 37, such is adapted to slide periodically along spindle 33 relative to the hammer frame for the purpose of striking the anvil means 21, as will be described in greater detail later. In general, the hammer means 31 is formed with a substantially cylindrical main hub body portion 45 from the opposite sides of which project its aforementioned arm portions 38, 38; each of the latter bearing an arcuate striking segment 46 extending from one face 47 thereof, as shown in FIGS. 1 and 17, for example. The hammer hub portion 45 is further concentrically symmetrical of a cylindrical axial bore 48 therethrough, provided for the free passage of the spindle 33, and a pin 49 projects from a back face thereon for driving engagement with the cam-clutch means 32, as will be amplified hereinafter.

Both the anvil means 21 and the hammer means 31 are mounted concentrically about spindle 33; the anvil means being rotatable with the spindle, while hammer means 31 rotates about and, within limits, relative to the spindle in response to driving rotation of the hammer frame 30. Hammer means 31 is also arranged, as mentioned, to slide periodically along the spindle; such movement being in response to opposing operations of the clutch means 32 and a return spring 50; the latter of which extends between a washer 51 adjacent face 47 of the hammer means and a cylindrical shoulder 52 formed by one end of a cylindrical head portion 53 on the spindle.

As illustrated in FIGS. 1 and 2, a pair of pins 54, 54 are received in matching recessed areas formed in the spindle head 53 and the adjacent walls of a blind bore 55 formed axially inwardly of one inner end 56 of the anvil member. This arrangement serves to lock the spindle and anvil together, and in this regard it will be noted that gore 55 receives both the spindle and the surrounding return spring 50. A single ball bearing 57 is also disposed between the outer end of the spindle head 53 and a conical seat formed in the bottom end 58 of the blind bore 55. This serves to align the spindle coaxially of the bore 55.

Figure 22:
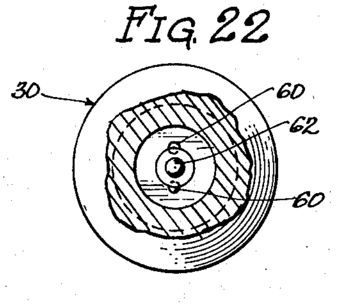
Figure 23:
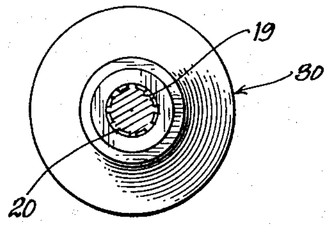
FIG. 23 is a right-hand end elevational view of the mechanism seen in FIG. 2, taken substantially from vantage line 23—23 of that figure.

The opposite or inner end of spindle 33 is similarly coupled to one cam element of the clutch means 32 by means of a pair of ball keys 60, 60 (see FIGS. 1 and 22) received in suitable matching recesses formed in opposing adjacent walls of the spindle and an annular surrounding anvil-cam element 61 of the clutch means. A second single ball 62 is also disposed between the other or inner end of the spindle and an adjacent bearing plate 63 which is provided with a central pilot recess 64 and located in the bottom of the central cup forming bore 35 of the hammer frame.

Cam-clutch means 32 uniquely comprises three disc-like metal clutch elements suitably hardened or selected of a material having desirable resistance to wear. Such three elements are, namely, the anvil-cam element 61 as mentioned, an intermediate floating cam element 65, and a hammer-cam element 66, each of which now will be described in detail. Basically these three elements are coaxially aligned end-to-end on the spindle 33 within the cup bore of the hammer frame 30 and include cam track means and suitable followers to effect their periodic axial separation in response to relative rotational movement therebetween, as will appear hereinafter.

The anvil-cam element 61, as shown best in FIGS. 1–3 and 8, is disposed next to the plate 63 in the bottom of the cup bore 35 in the hammer frame and is formed with a cylindrical hub portion 67 extending axially outwardly from the inner end thereof to afford a cylindrical shoulder engaging a surrounding supporting ball bearing means 68 disposed between the same and the side walls of cup 35. This cam element is further formed to include a central counterbore 69 which extends centrally inwardly of its outer end wall 70 opposite and concentric of hub portion 67 thereon for interfitting relation with the hammer-cam element 66, as will appear presently.

The end wall 70 of cam element 61, as seen, for example, in FIGS. 1–3 and 21, is also particularly distinguished by the formation and inclusion of a pair of semi-annular indented grooves 71, 72, each having a head end stop portion 73 and a tail end riser or node portion 74. Grooves 71, 72 are arranged end-to-end in a circular path so that the stop portion of one groove lies immediately adjacent the node or riser portion of the other groove. This general relationship and arrangement is typified in FIGS. 6 and 7 of the drawings. The grooves 71 and 72 so provided in the cam element 61 provide a raceway for a single ball follower 75; such raceway forming a cam track having two nodes or risers which force the ball follower to periodically rise out of the grooves 71, 72 in response to relative movement therebetween and between cam element 61 and an adjacent intermediate floating cam element 65.

The intermediate cam element 65 likewise has a pair of recessed and cooperatively arranged semi-annular grooves 71′ and 72′ in its one face 76 (see FIGS. 1–3 and 20) which is normally disposed adjacent the grooved face of cam element 61. Such intermediate cam element 65 is further formed as an annular ring member to ride or float freely about the coaxial spindle member 33, and more particularly on an intervening cylindrical hub portion 77 of the hammer-cam element 66. As indicated above, the two grooves 71′ and 72′ in the one face 76 thereof oppose the corresponding grooves 71 and 72 of cam element 61; each such groove, like grooves 71, 72, including a head end stop portion 73′ and a riser node portion 74′ for cooperation with the single ball cam follower 75.

Figure 19:
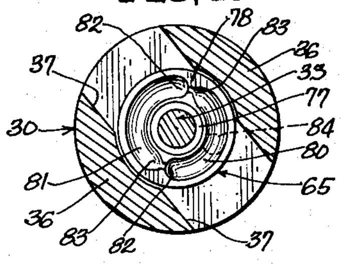
Figure 20:
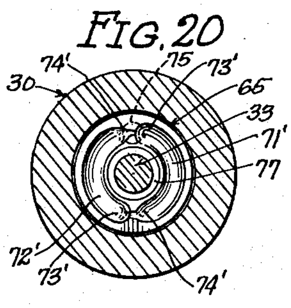
Figure 21:
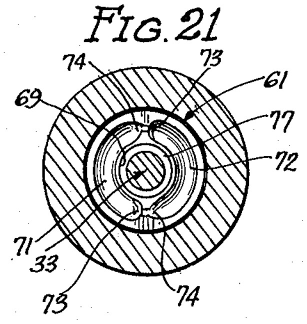

The opposite face or end wall 78 of the intermediate cam element, as shown best in FIG. 19, includes still another set of grooves 80 and 81, each having a head end stop portion 82 and a tail end riser or cam node portion 83. Grooves 80, 81 cooperate with another single ball cam follower 84 and a correspondingly opposing set of grooves 80′ and 81′ formed in an adjacent end wall 85 of the hammer-cam element 66.

Figure 18:
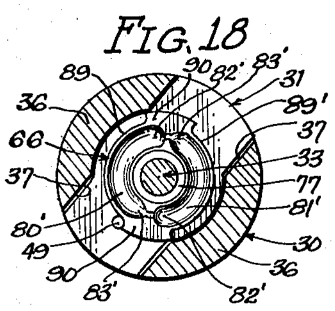

Grooves 80′, 81′, likewise are formed with end stop portions 82′ and riser portions 83′. When cam elements 65 and 66 are assembled as set out in FIG. 1, grooves 80, 81 oppose grooves 80′, 81′ respectively and act as a raceway for their related single ball follower 84 (see FIGS. 18 and 19). In this regard, the riser portion of groove 80 opposes the stop end portion of groove 80′ and likewise as to the opposing grooves 81, 81′. So related, such grooves cooperate to cause the single ball follower 84 to periodically move along the riser or node portions therein to axially separate cam elements 65 and 66 in response to relative rotation therebetween, similar to the operational relationship between cam elements 61 and 65.

While the features of this functional relationship of the several cams and grooves and their stop and riser portions will be set out in more detail presently, reference is made at this point to FIGS. 24–29 which illustrate the cam tracks or grooves and their related followers in operation.

As noted above, hammer-cam element 66 includes a cylindrical hub portion 77 which extends through the central opening of the intermediate cam element 65 and into the counterbore 68 of the anvil-cam element 61 (see FIG. 1). Cam element 66 additionally includes an annular substantially cylindrical body portion 86 having the one face 85 in which are formed the described cam grooves 80′, 81′. A second hub portion 87 also extends from body portion 86 axially outwardly of the outer end wall or face 88 thereof to lie coaxially opposite hub portion 77. This second hub portion is concentrically surrounded by and provides bearing support for the adjacent hammer means 31; the spindle member 33 passing coaxially through both hub portions 77 and 87, as will be understood by examining FIGS. 1 and 2 of the drawings.

It will be recalled that a pin means 49 projects rearwardly from the hammer means 31 to effect connective cooperation between the hammer means and the cam-clutch means 32. In order to accommodate reverse operation of the impact mechanism in response to counterclockwise driving of the shaft 19, and more especially to permit the impact segments 46 of the hammer means to strike the reverse striking surfaces 25′ on the anvil arms 24, connection of the hammer means with the clutch means 32 embraces a lost motion system. To this end, the periphery of the body portion 86 on the cam element 66 is cut away a substantial arcuate distance, at one or more places, to receive the projecting pin 49. In the particular embodiment illustrated in FIG. 18, for example, there are two such cut-away areas 89, 89′, either or both of which may be employed to effect connection with the hammer means, as selected. With such an arrangement the peripheral portions of the cam element 66 lying between adjacent cut-away areas 89, 89′ constitute arcuate stop ears or segments 90, 90 which interferingly engage the pin means 49. Thus positive driving connection between cam element 66 and the hammer means during both forward and reverse driving of the impact mechanism is achieved while providing limited relative movement or lost motion connection between the hammer and cam-clutch means to permit striking the arcuately separated striking surface areas 25 and 25′ of the anvil means without changing the operational phase of the cam-clutch system; the latter operating to effect axial displacement of the hammer means at pre-selected fixed points in the rotational cycle for the hammer means.

Turning now to the operational features of the above-described mechanism, reference is made particularly to FIGURES 2, 3, 8 through 12, and 24 through 29.

As shown in FIGURE 2 of the drawings, counterclockwise rotation of the drive shaft 19 in response to corresponding actuation of prime mover 17, causes relative rotational motion and axial separation between cam element 61 and cam elements 65—66. As shown in FIGURE 3, clockwise rotation of the drive shaft 19 similarly causes axial separation of cam element 66 from cam elements 65, 61. In both instances, that is, clockwise and counterclockwise rotation of the drive shaft 19, the hammer means 31 is periodically thrown or forced axially toward the anvil means 21, against the force of return spring 50, to produce interfering engagement between the striking segments 46 thereon and the striking surface portions 25 and 25′, respectively, of the anvil arms 24. This latter feature may be best understood by examining the sequential operation FIGURES 8–12 of the drawings.

Figure 8:
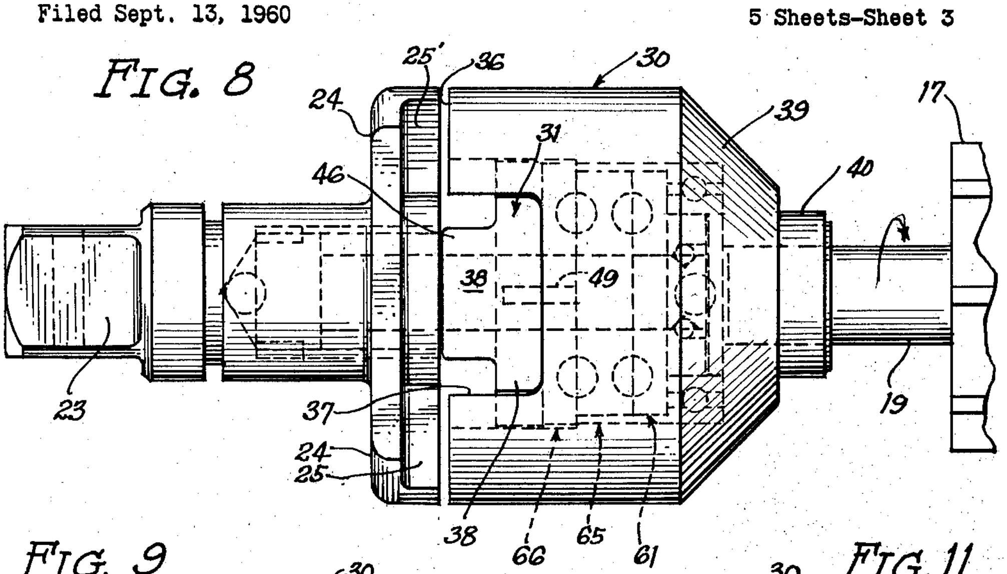
FIG. 8 is a view in side elevation of the improved impact mechanism of this invention, illustrating the relationship between the hammer, anvil, and clutch means thereof when the same are in a neutral or non-driving condition.
Figure 9:
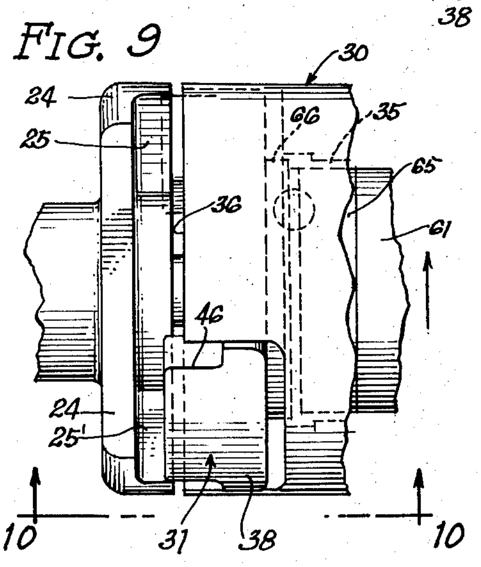
FIG. 9 is a partial side elevational view of the improved impact mechanism shown in FIG. 8, illustrating the relationship between the hammer and anvil means at the initiation of a driving cycle during clockwise rotation.
Figure 11:
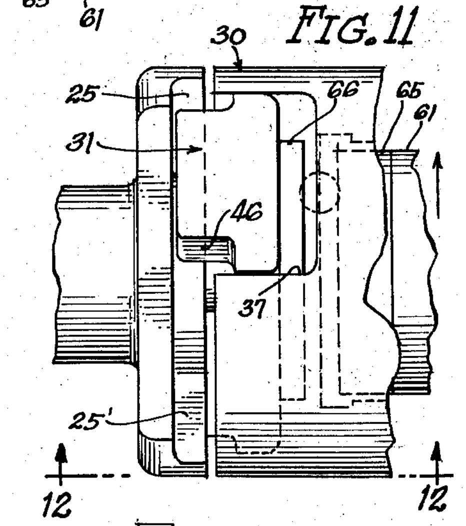
FIG. 11 is another partial elevational view, similar to FIG. 9, showing the relationship of the hammer and anvil means thereof in full driving engagement under clockwise rotation.
Figure 10:
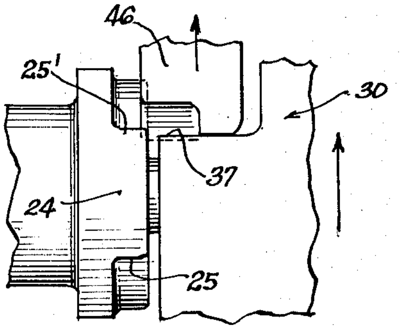
FIG. 10 is a partial enlarged elevational view of the impact mechanism as seen substantially from vantage line 10—10 of FIG. 9 to further illustrate the relationship of the hammer and anvil means therein.
Figure 12:
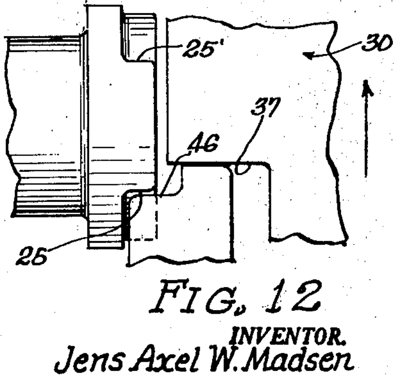
FIG. 12 is a partial elevational view of the hammer and anvil means as seen from vantage line 12—12 of FIG. 11.
Figure 13:
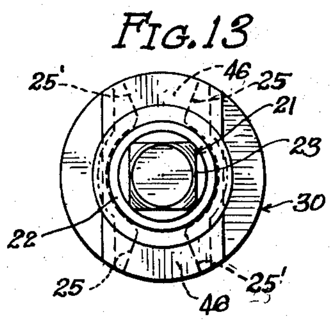
FIG. 13 is a left-hand end elevational view of the impact mechanism seen in FIG. 2, taken from vantage line 13—13 of that figure and looking in the direction of the arrows thereon.
Figure 14:
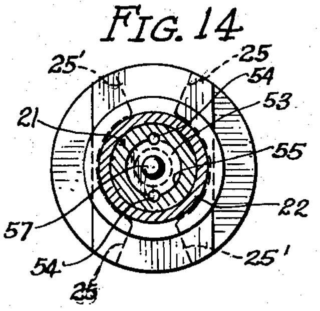
FIGS. 14–22 are various cross-sectional views taken at, and looking in the directions indicated by the respective arrows on, the several correspondingly numbered section lines of FIG. 2, to illustrate the arrangement of elements in my improved impact mechanism.
Figure 15:
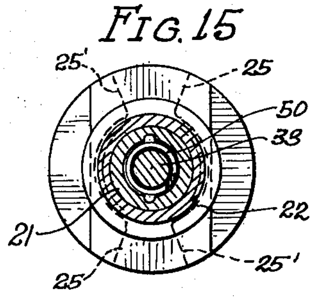
Figure 16:
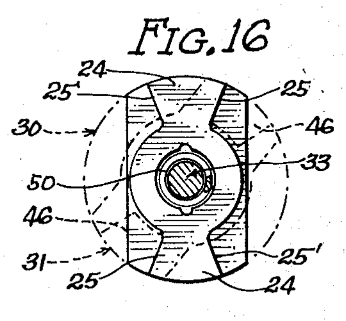

As seen in FIGURE 8, the hammer mechanism and particularly the clutch means 32 therein is in a neutral operating condition with the several clutch elements 61, 65 and 66 in adjacent coaxial contacting relationship. As the hammer frame 30 rotates with shaft 19 in a clockwise sense (see FIGURE 9), relative rotation occurs between cam elements 66 and 61; the latter being locked-up with the cam element 65. As to this latter feature, it will be recalled that cam element 61 is pinned to the inner end of the spindle member which in turn is fixedly associated at its outer end with the anvil means 21. On the other hand, cam element 66 is connected by pin 49 to hammer means 30 and the latter is nested in one end of the hammer frame 30 for rotation therewith. Thus, clockwise rotation of the hammer frame 30, likewise rotatably drives hammer-cam element 66 while cam element 61 remains relatively stationary with the anvil means 21 to which appropriate tool means are attached for engaging the item to be worked on.

Figure 24:
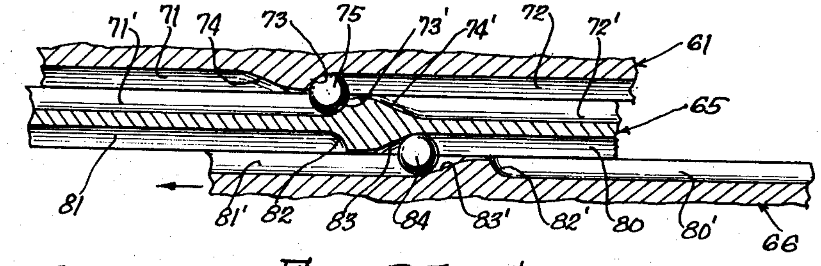
FIGS. 24–26 are successive developed views of cam track and follower means used in the improved cam-clutch means of this invention, illustrating a complete cycle of operation for moving the hammer means into a position of interfering contact with the anvil during right-hand or clockwise rotation of the hammer means and drive shaft.
Figure 25:
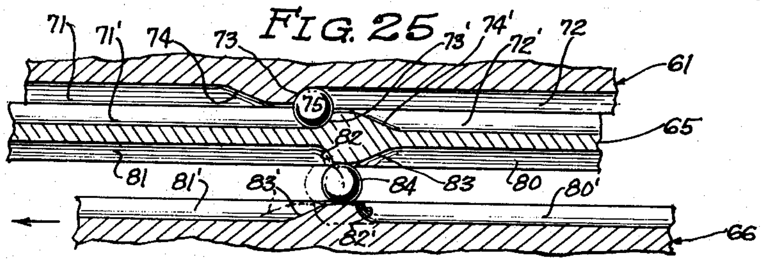
Figure 26:
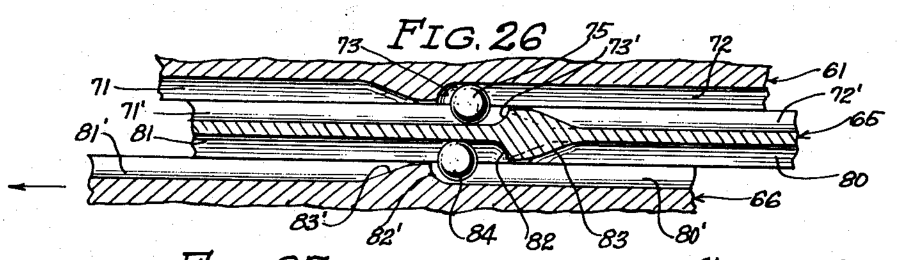

The relatively fixed relation of the intermediate or floating cam 65 with respect to the rotatably driven hammer-cam element 66 is brought about, as illustrated in FIGURES 24–26 when the two stop portions 73 and 73′ of cam elements 61 and 65, respectively, are moved relative to one another until they achieve substantially opposed alignment with the single ball follower 75 therebetween. This relation causes a mechanical lock-up between cams 61 and 65 as particularly illustrated in FIGURE 24. With the cam elements 61 and 65 so interlocked against relative rotational movement, the same remain relatively fixed or stationary with the anvil means and with respect to the driven cam element 66. As a result of this arrangement, eventually the two inclined node portions 83 and 83′ of cam elements 65 and 66, respectively, are brought into relatively opposed positions with the single ball follower 84 therebetween, causing the latter to ride along the incline of the opposing node portions and axially separate cam elements 65 and 66, as shown in FIG. 25. Additional like relative movement between cam element 66 and the interlocked cam elements 61, 65 causes the ball follower 84, as set out in FIGURE 26, to ride over the node portions 83, 83′ and quickly drop into the opposing cam track grooves 81, 80′, when the stop portions 82, 82′ therein are brought into relatively opposed relationship. Assisting in this quick return feature is the tendency and designed capability of the free floating intermediate cam 65 to kickback in a reverse direction relative to both cams 61 and 66 as the ball 84 moves past dead center over node portion 83 (see FIG. 26). The quick dropping return action of the ball follower 84, of course, also produces like quick axial return movement of the cam element 66 toward cam element 65 with an attending retraction of the hammer means from its position of interfering engagement with the anvil means.

Figure 30:
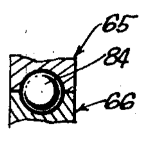
FIG. 30 is a partial cross-sectional view taken at line 30—30 of FIG. 29.

It will be understood from FIGS. 6, 7, 18 and 19 that each of the cam elements 65 and 66 includes two recessed cam track grooves with two nodes or risers and two stop portions, which are opposingly aligned for operation, as above set forth. The arcuate distance of each cam track so provided, measuring between centers of the associated stop and riser portions, is substantially 180°. As explained above, after ball 84 rides over and between two opposed riser portions, such as 83, 83′ illustrated in FIG. 25, it returns to the thereafter opposed grooves 81 and 80′ (FIG. 26), and at a point adjacent and between the then relatively opposed stop portions 82, 82′. Before ball 84 can again ride over opposed riser portions to separate cam elements 65 and 66, it must travel the length of groove 80′, substantially 180°, as well as the length of groove 81, another substantially 180° distance. In the initial stage of this travel along grooves 80′ and 81, stop portion 82′, associated with the moving or driven cam element 66, moves away from and relative to the ball follower; the latter preferably riding freely in the grooves when the cam elements are in contacting adjacency due to appropriate clearance, built into the grooves as shown in FIGURE 30. Eventually, however, the riser portion 83′ of groove 80′ will pick up the ball follower and move it therewith along and relative to the groove 80 until the riser portion 83 of the latter is once again contacting the ball follower. This latter condition occurs, after approximately 360° of relative rotation between cam elements 65 and 66, i.e., after ball 84 has traveled the length of both grooves 80′ and 81 (see FIGURE 24). Thus it will be recognized that one separation of cam elements 65 and 66 occurs for each full revolution of the driven hammer cam 66.

The above-described operation of the several cam elements 61, 65, and 66 to cause axial separation of cam elements 61 and 65 is harnessed by the mechanism of this invention to produce a gradual axial displacement and quick return of the hammer means 31 as shown in FIGURES 9–12. As shown in this group of figures, in response to the gradual separation of the cam elements 65 and 66, the hammer means 31 moves axially toward the anvil means 21, moving the striking segments 46 thereon into interfering alignment with the striking portions 25 or 25′ of the anvil arms 24 to deliver a rapid sharp blow to the latter as desired. In thus striking the anvil means, the kinetic energy of the rotating hammer means and the hammer frame 30 along with the driving force of the prime mover 17 is instantaneously delivered to the anvil, giving the same marked driving torque impact. After striking the anvil, the hammer means is thereupon rapidly returned to battery within the recessed or cut-out end portions of the hammer frame in response to returning force exerted by the spring means 50 which is released by the above-described quick drop return of the cam follower ball 84.

It will be understood additionally that while, as shown in FIGS. 6, 7, 18 and 19, cam elements 66 and 65 each include two riser and two stop portions so that each 360° of relative rotation between cams 66 and 65 produces one axial separation thereof, this operational frequency of impact may be varied, depending upon the number of cam node risers involved in the cooperating cam elements.

One typical modification of the cam elements to change impact frequency is illustrated in FIGS. 4 and 5 where, for example, modified cam elements 100 and 101 are shown, each with but a single cam groove 102, 102′, a single stop portion 103, 103′, and a single riser portion 104, 104′, respectively. When using such a modified set of cams, one axial separation of the opposing cam elements and attending lifting of the hammer means occurs for each two revolutions of the driven hammer cam or each 720° of relative rotation of the cooperating cam elements.

Figure 27:
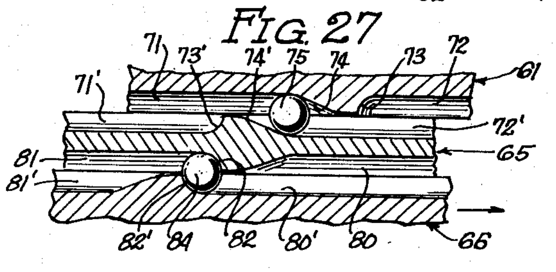
FIGS. 27–29 are developed views of the cam track and follower means set out in FIGS. 24–26, to illustrate their corresponding cycle of operation during left-hand or counterclockwise rotation of the hammer means and drive shaft.
Figure 28:
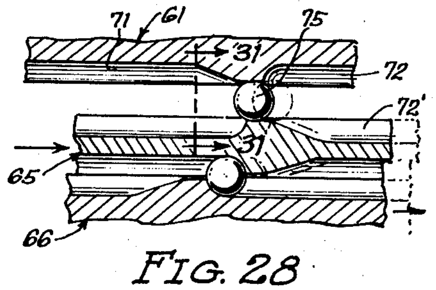
Figure 29:
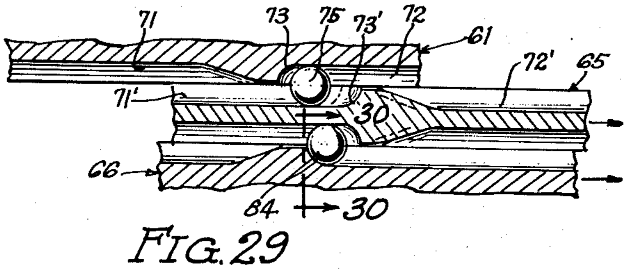
Figure 31:
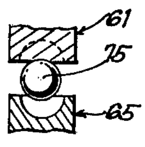
FIG. 31 is another cross-sectional view, similar to FIG. 30 taken at line 31—31 of FIG. 28, but showing the clutch elements separated.

As mentioned previously, reverse or counterclockwise rotational movement of the drive shaft 19, as set forth in FIGURE 2, causes axial separation of the two cam elements 61 and 65 instead of cam elements 66 and 65 as previously described, and in accordance with the activity of the three cam elements illustrated in FIGURES 27 through 29. In this condition of operation the cam element 66, again through its connection with the hammer means, rotates therewith, while the hammer means moves with the hammer frame 30 and the drive shaft 19. In this function the lost motion connection between cam element 66 and the hammer means permits a relative movement or phase shift therebetween sufficient to permit the hammer means to be raised on the other side of the anvil arms to engage the reverse striking surfaces 25′, 25′ thereon. Movement of cam 66 with the hammer means causes such cam to rotate initially relative to the adjacent floating cam element 65 until two stop portions, such as 82, 82′ of their respective grooves 81, 80′ are substantially opposite with the single cam follower ball 84 therebetween. Thus, a positive mechanical lockup is effected between the cam elements 66 and 65 so that the latter moves with and is driven by cam element 66, the hammer means 31 and the hammer frame 30 in response to rotational driving action of the drive shaft 19. Meanwhile the anvil-cam element 61 remains relatively stationary since it is pinned or fixed to the inner end of the spindle means which, in turn, is keyed to the anvil means 21 engaged with the item to be worked on. Thus, relative rotational movement is again brought about between two of the adjacent cams; in this instance, between cam elements 65 and 61. This activity eventually brings two of the cam riser portions 74 and 74' opposite, as shown in FIGURE 27, so that continued relative movement therebetween subsequently causes the single cam follower ball 75 to ride along the slope of the opposing riser portions 74 and 74' to axially separate cam elements 61 and 65 (see FIGURES 28 and 31). When this function occurs, as in the previously described condition of clockwise rotation for drive shaft 19, the hammer means 31 is thrown or moved axially outwardly against the force of spring means 50 to engage and deliver a striking blow to the arms of the anvil means, thus delivering instantaneous kinetic energy and torque impact to the anvil for driving whatever tools are attached to its outer end. Quick return action of the hammer means to its nested condition within the hammer body and consequently its clearance from the anvil means is achieved in response to continued relative rotation between the cam elements 61 and 65 to bring two stop portions, such as 73 and 73', opposite as illustrated in FIGURE 29. This, of course, provides a rapid return of the single ball follower 75 into the then opposing grooves 72 and 71'; with corresponding axial return of the cam element 65 to engage cam element 61 in response to the urging activity of return spring means 50.

As previously related, when cam elements 61 and 65 include two equal opposing cam grooves, each with a riser and stop portion, every 360° of relative rotation therebetween produces one axial separation and return movement of the hammer means, resulting in the delivery of one impact blow to the anvil means. If the modified cam elements 100 and 101 of FIGURES 4 and 5 are substituted therefor, then one blow will be delivered to the anvil means for each 720° of relative rotation therebetween.

It is further intended, within the scope of this invention, that each of the cam elements 61, 65 and 66 may selectively include in their opposing cooperative cam grooves one, two, or more riser and stop portions to produce a desired corresponding frequency of delivering impact to the anvil means. Further, the opposing cam grooves of elements 61 and 65 may include a single node or riser, for example, while the opposing cam grooves of cam elements 65 and 66 may include one or more riser portions and vice versa; or, even further, a single node cam track of one cam may oppose a plural node cam track of an adjacent cam, giving a wide variety of selectable frequency combinations. The versatility of the unique cam-clutch means of this invention will thus be recognized as fully capable of producing a wide selection of operating characteristics for the impact tool with which it is associated.

By way of example, if the opposing cam grooves of cam elements 65 and 66 each included two nodes and two stop portions, as illustrated in FIGURES 6 and 7, while the opposing grooves of cam elements 65 and 61 included only one riser and one stop portion each, then during the clockwise driving movement of drive shaft 19 one impact blow would be delivered to the anvil means for each revolution or drive shaft and cam 66; while during reverse or counterclockwise rotation of the drive shaft one impact blow would be delivered to the anvil means for each two revolutions thereof. In still another instance, if a double node cam track is opposed to a single node cam track, then one impact blow will be delivered for each one and one-half revolutions of the drive shaft. These and other variations will readily come to mind and be recognized by those skilled in the art and therefore need not be amplified in further detail herein, other than to point out that the available selectivity of the frequency of delivering blows to the anvil means for both forward and reverse drive directions is readily available by selecting a given number and combination of cam nodes for the respective cooperating cam elements of the cam-clutch means.

While I have hereinabove set forth and described the general structural requirements, functions and features of the improved mechanism of this invention, it will readily be recognized by those familiar with the art that numerous modifications, changes and substitutions of equivalents may be made therein without necessarily departing from its spirit and scope. Further, while I have described my invention as it appears in the preferred embodiment herein illustrated, it is not my intention that I be limited by the particulars of the foregoing description except as may appear in the following appended claims.

I claim:

1. An improved impact mechanism for use in rotary impact tools and adapted to be rotatably driven by a prime mover to deliver torque impact to a driven tool element comprising in combination, a rotatably supported hammer frame having driving connection with the prime mover and formed with an axial cup bore opening centrally inwardly of its one end and including diametrically opposed recesses in its said one end, hammer means having radially extending arm portions, each with a striking segment, nested in the said recesses of the hammer frame for coaxial rotation therewith, a spindle member extending coaxially into said cup bore and through said hammer means and having one end portion projecting axially outwardly of said hammer frame and hammer means, anvil means mounted on the said one end portion of said spindle means for connection with tool elements to be driven and including radially extending arm portions disposed adjacent said hammer means and presenting striking surfaces for impact engagement by the said striking segments of said hammer means, spring means normally biasing said hammer means axially away from said anvil means, and cam means mounted between the bottom of said cup bore and said hammer means and comprising a plurality of annular cam elements arranged concentrically of said spindle means and including cooperating cam portions for effecting periodic axial displacement of certain of said elements and said hammer means against the force of said spring means in response to predetermined relative rotation between said cam elements, lost motion connector means connecting one of said cam elements to said hammer means for periodic relative and conjoint rotational movement therewith and means positively connecting another of said cam elements to said spindle means for conjoint rotational movement therewith thereby to effect the said relative rotation.

2. The combination as set forth in claim 1 in which said cam elements have their cam portions cooperatively arranged with follower means between opposing end faces thereof to operate at preselected points of relative rotation between said cam elements to effect relative axial displacement thereof along said cup bore.

3. The combination as set forth in claim 1 wherein the said cam elements have like cooperating cam portions arranged and characterized to effect their relative axial displacement once for each revolution of said hammer means.

4. The combination as set forth in claim 1 wherein said cam elements have their cooperating cam portions arranged and characterized to effect axial displacement of said elements once for each two revolutions of said hammer means.

5. The combination as set forth in claim 1 wherein said cam means includes three of said cam elements arranged in coaxial end-to-end adjacency with the intermediate one of said elements being freely rotatable about said spindle means, and cam follower means cooperating with said cam portions for mechanically locking said intermediate cam element with either one of the other two cam elements and for axially displacing the remaining cam element relative to said intermediate cam element in response to relative rotation of said cam elements.

6. An improved impact mechanism for use in rotary impact tools adapted to be rotatably driven by a reversible prime mover for the purpose of delivering torque impact to a driven tool element comprising in combination, a rotatably supported substantially cylindrical hammer frame having driving connection with the prime mover and formed with a central cup bore and diametrically opposed recesses opening inwardly of its one end, hammer means having radially extending arm portions, each with a striking segment nested in the said recesses of the hammer frame for rotation therewith, the said hammer means being disposed coaxially of said cup bore, a spindle member extending coaxially into said cup bore and through said hammer means and having one end portion projecting axially beyond said hammer frame and hammer means, anvil means mounted on said one end portion of said spindle means for connection with tool elements to be driven and including radially extending arm portions disposed adjacent said hammer means and presenting striking surfaces for impact engagement by the said striking segments of said hammer means in response to periodic axial movement of the latter along said spindle member, spring means normally biasing said hammer means and anvil means away from one another, cam means mounted in said cup bore between the bottom of the latter and said hammer means and comprising a plurality of annular cam elements arranged concentrically of said spindle means with cooperating cam portions for effecting their relative displacement axially of said cup bore in response to relative rotation therebetween thereby to effect said periodic axial movement of said hammer means, lost motion connector means connecting one of said cam elements to said hammer means for periodic conjoint rotation therewith and additional means connecting another of said cam elements to said spindle mean for conjoint rotational movement therewith whereby to effect the said relative rotation between said cam elements.

7. The combination as set forth in claim 6 wherein said cam means comprises three cam elements arranged in coaxial end-to-end adjacency, the intermediate one of which is freely rotatable about said spindle means, the said cam portions thereof cooperating with cam follower means disposed between adjacent opposing end faces thereof and arranged to effect axial displacement of said one cam element and to effect a mechanical interlocking of the intermediate cam element with one of the remaining two cam elements during both clockwise and counterclockwise rotation of said hammer means.

8. The comination as set forth in claim 7 wherein the said cam portions and cam follower means are characterized and arranged to cause one axial displacement of the said one cam element for each revolution of said hammer means in either clockwise or counterclockwise directions.

9. The combination as set forth in claim 7 wherein said cam portions and cam follower means are arranged and characterized to effect the said axial displacement of said one cam element once for every other revolution of said hammer means.

10. An improved impact mechanism for use in rotary impact tools and adapted to be rotatably driven by a reversible prime mover to deliver torque impact to a driven tool element comprising in combination, a rotatably supported hammer frame having driving connection with the prime mover and formed with a central cup bore and diametrically opposed recesses inwardly of its one end, hammer means having radially extending arm portions each with a striking segment nested in the said recesses of the hammer frame whereby said hammer frame and hammer means are conjointly rotatable with the prime mover, a spindle extending coaxially of said cup bore and hammer means and having one end portion projecting axially outwardly of said hammer frame and hammer means, anvil means mounted on said one end portion of said spindle for connection with tool elements to be driven and including radially extending arm portions disposed adjacent said hammer means and presenting striking surface portions for impact engagement with the striking segments of said hammer arm portions, spring means normally biasing said hammer means away from said anvil means, cam-clutch means mounted in said cup bore and including a plurality of annular cam elements mounted in coaxial adjacency on said spindle and formed with registeringly opposed recessed cam tracks in their adjacent end faces receptive of ball follower means, said cam tracks including cam node riser portions, one of said cam elements being connected to said spindle and another thereof to said hammer means whereby rotation of said hammer means with said hammer frame produces relative rotation between said cam elements to cause said ball follower means to move over said riser node portions and axially separate said cam elements, the axial separation of said cam elements compressing said spring means and moving said hammer means axially toward said anvil means to effect impact engagement between their respective said striking segments and striking surfaces.

11. The combination as set forth in claim 10 wherein said cam tracks also include stop portions arranged to cooperate with the ball follower means to prevent relative rotation of predetermined different pairs of cam elements during both clockwise and counterclockwise rotation of said hammer means and hammer frame.

12. The combination as set forth in claim 10 wherein said one cam element has lost motion connection with said hammer means to cause the latter to rotate relative to said one cam element and engage striking surface portions on opposite sides of the said arm portions on said anvil means during clockwise and counterclockwise rotation of said hammer means.

13. In an impact mechanism an improved cam-clutch means comprising, a plurality of disc-like cam elements arranged in coaxial end-to-end adjacency, said cam elements having cooperating cam portions with riser means and stop means between the adjacently opposed faces thereof, cam follower means engaging said cam portions, means normally biasing said cam elements into contacting adjacency, and means for effecting relative rotation of adjacent cam elements to produce their periodic axial separation against the effect of said biasing means when the riser portions of adjacent cam elements are moved into opposing relationship with the said cam follower means therebetween and to interlock the same when said stop means are moved into opposing relationship with said follower means therebetween.

14. In an impact mechanism an improved cam-clutch means for producing periodic reciprocating motion comprising, a plurality of disc-like cam elements arranged in coaxial end-to-end adjacency with the opposing end faces thereof having opposing cam tracks, cam follower means freely movable in and along the said cam tracks between adjacent cam elements, stop means in each of said cam tracks for positively moving said follower means along an opposing cam track, riser means in each of said cam tracks, and means for rotating adjacent ones of said cam elements relative to one another whereby certain of said cam follower means periodically engage said stop means in selected opposing cam tracks to arrest relative movement between said selected cam elements associated therewith while other cam follower means engage riser means of other opposing cam tracks thereby to axially separate other cam elements.

15. In an impact mechanism an improved cam-clutch means between a rotatable drive means and a periodically impacted rotatably driven means comprising, a pair of annular cam elements aranged in coaxial end-to-end adjacency with one of said cam elements being conjointly rotatable with said driven means and the other thereof having lost motion connection with said drive means for predetermined rotation relative to and conjointly with said drive means, said cam elements having cooperating cam portions between the adjacently opposed end faces thereof comprising cam tracks formed inwardly of said faces and including cam riser portions, and ball follower means in said cam tracks adapted periodically to engage opposing riser portions thereof to axially separate said cam elements upon preselected relative rotation of the latter.

16. In an impact mechanism an improved clutch means between a reversible rotatable drive means and a rotatably driven member periodically impacted by axially movable hammer means comprising, three annular cam elements arranged for rotation in coaxial end-to-end adjacency with the intermediate cam element being freely rotatable relative to the other two cam elements, the said other two cam elements being rotatable with the drive means and the driven member, respectively, means for locking said intermediate cam element to either one of said other two cam elements as selected, and cam and cam follower means between adjacent opposed end faces of said intermediate cam element and each of said other two cam elements operable upon preselected relative rotation between adjacent cam elements to axially displace one of said cam elements relative to said intermediate cam element and lock the remaining cam element to said intermediate cam element for conjoint rotation therewith.

17. In an impact mechanism an improved clutch means between rotatable drive and driven means comprising, three annular cam elements arranged in end-to-end coaxial adjacency with the intermediate cam element being freely rotatable relative to the second and third cam elements, each of said second and third cam elements being rotatable relative to each other and said intermediate cam element, one moving with the drive means and the other thereof with the driven means, annular cam track means formed in adjacent opposing faces of said three cam elements with each cam track means including arcuately spaced cam riser and stop portions, the cam track means in adjacent opposed faces of adjacent cam elements being disposed in opposing registration, and a single ball follower means movable along the opposing cam track means between adjacent cam elements, whereby relative rotation between said cam elements causes the ball follower means in the opposing cam tracks of said intermediate and either one of the other two said cam elements, selected by the direction of driving rotation, to simultaneously engage the stop portions therein and thereby interlock the intermediate and one cam element for conjoint rotation relative to the remaining cam element, with relative rotation between said intermediate cam element and said remaining cam element periodically causing the ball follower means in the opposing cam tracks in the adjacent opposing faces thereof to periodically and simultaneously engage the cam riser portions therein and axially separate said intermediate and remaining cam elements.

References Cited in the file of this patent

UNITED STATES PATENTS

| | | |
|---|---|---|
| 1,657,274 | Niedhammer | Jan. 24, 1928 |
| 2,518,049 | Mosier | Aug. 8, 1950 |
| 2,539,678 | Thomas | Jan. 30, 1951 |
| 2,691,434 | Jimerson | Oct. 12, 1954 |
| 2,720,956 | Coombes | Oct. 18, 1955 |
| 2,745,528 | Amtsberg | May 15, 1956 |
| 2,784,818 | Maurer | Mar. 12, 1957 |
| 2,792,732 | Brucker | May 21, 1957 |
| 2,801,718 | Kaman | Aug. 6, 1957 |
| 2,808,916 | Johnson | Oct. 8, 1957 |
| 2,825,436 | Amtsberg | Mar. 4, 1958 |
| 2,827,994 | Tiedeman | Mar. 25, 1958 |
| 2,842,994 | Stine | July 15, 1958 |
| 2,881,884 | Amtsberg | Apr. 14, 1959 |
| 2,907,240 | Schwenk et al. | Oct. 6, 1959 |

FOREIGN PATENTS

| | | |
|---|---|---|
| 1,091,048 | France | Oct. 27, 1954 |
| 594,051 | Canada | Mar. 8, 1960 |